United States Patent [19]

Bossi

[11] E Re. 29,994

[45] Reissued May 15, 1979

[54] ELECTRIC TRACTION TRANSPORTATION SYSTEM WITH STORAGE BATTERY POWERED VEHICLES AND FAST RECHARGE AT THE VEHICLE STOPS

[76] Inventor: Oscar Bossi, Largo Domodossola 7, Milan 20145, Italy

[21] Appl. No.: 847,616

[22] Filed: Nov. 1, 1977

Related U.S. Patent Documents

Reissue of:

[64] Patent No.: 3,955,657
Issued: May 11, 1976
Appl. No.: 442,881
Filed: Feb. 15, 1974

[30] Foreign Application Priority Data

Feb. 15, 1973 [IT] Italy ..... 20427 A/73

[51] Int. Cl.[2] ..... B60L 1/00

[52] U.S. Cl. ..... 191/2; 191/29 R; 320/20; 191/1 R

[58] Field of Search ..... 320/20; 191/1 R, 2, 191/3, 4, 12 R, 29 R, 22 R, 45 R-50

[56] References Cited

U.S. PATENT DOCUMENTS

| | | | |
|---|---|---|---|
| 894,333 | 7/1908 | Ledwinka | 191/4 |
| 3,169,733 | 2/1965 | Barrett | 191/29 |
| 3,816,806 | 6/1974 | Mas | 320/20 |

*Primary Examiner*—Trygve M. Blix
*Assistant Examiner*—D. W. Keen
*Attorney, Agent, or Firm*—Milton M. Field

[57] ABSTRACT

An urban mass transportation system is disclosed which makes use of storage battery powered vehicles. In view of the specific use which implies preestablished routing of the vehicles and preestablished stops at frequent intervals, the capacity of the batteries installed in each vehicle is commensurate to the capability of running for a limited distance. The vehicles are further provided with contact means, such as trolleys, for performing a fast recharge of the batteries at the stop stations, without removing the batteries. The stop stations are equipped with devices mating with the contact means and suitable for allowing a fast recharge. Electrical power is taken from an electrical distribution network independently from the routing of the vehicles.

7 Claims, 3 Drawing Figures

ELECTRIC TRACTION TRANSPORTATION SYSTEM WITH STORAGE BATTERY POWERED VEHICLES AND FAST RECHARGE AT THE VEHICLE STOPS

Matter enclosed in heavy brackets [ ] appears in the original patent but forms no part of this reissue specification; matter printed in italics indicates the additions made by reissue.

BACKGROUND OF THE INVENTION

The instant invention deals with land transportation means in which such means operates over relatively short stretches between one stop and the following one. In particular, this invention deals with mass transportation systems, such as the urban transportation systems, where many intermediate stops at determined places must be effected. Considering, by way of example, urban transportation means, which practically have not been subjected to changes in the last half century, it is possible to distinguish: transportation means having a rigidly constrained path, which derive from the urbanized railway, such as trams (trolley-cars), underground vehicles, monorail vehicles, and like; transportation means having a free path, such as motorbuses; and transportation means having a semi-constrained path, such as trolley-buses.

Of these transportation means, the tram is declining in usage by reason of its rigidly constrained path which makes it unable to overcome any hindrance on its way, missing the agility and flexibility which is required in the modern traffic. The motorbus, which is mainly diesel motor powdered, is the most common and widespread transportation means by reason of its path freedom. However, its propulsive system has a serious disadvantage: air pollution caused by exhaust gases of internal combustion engines. In addition, the pollution is increased by the fact that during the service the engine remains in operation even at the stops. Other disadvantages are the wasting of energy due to the low efficiency of the engine and its noise. The trolley-bus, being free from rail constraints, thus not having a rigidly constrained path, was expected to replace trolley cars as well as motorbuses. In fact, it has the non-polluting, noiseless, and nimbleness advantages of electric traction. In spite of these advantages, use of the trolley bus has not spread as expected due to other disadvantages, such as: cost and complexity in building up the two pole electrical aerial power line; very high maintenance cost of the aerial lines; the impossibility for the vehicle to deviate to paths which are not provided with electrical power lines; and the limited transverse freedom allowed by the trolley, which is subject to disjunction from the line, if the trolley-bus, in order to avoid encumbrances, deviates transversely too much [will] *with* respect to the electrical line.

As a consequence, actual research projects are devoted to the development of urban transportation means free from any path constraint (power lines) or rigid way constraint (rails), as it is for the motorbus, and, however, noise and pollution exempt as it is for electrically powered vehicles. Many solutions have been proposed and many attempts made without obtaining a satisfactory result. Storage battery powered vehicles have been developed which are believed to be the best way to solve the problems of urban traffic. At the present day, however, they are not used because the energy sources available have a serious limitation: the very low value of specific energy stored per weight unit as compared to that for commonly used fuels. It may be verified that given the same useful energy, that is at equal vehicle performance, the ratio between storage battery weight and fuel weight is about 100, at the actual state of the art. It is estimated that this will be lowered to about 20 in the next years, if research projects presently under way will provide the expected results. In other words, the useful energy (convertible to kinetic energy) obtained, for instance, from 120 liters of diesel oil, whose weight is about 100 kilograms (this may be assumed as a standard quantity for a motorbus), would require today 10,000 kilograms of storage batteries and presumably 2,000 kilograms in the future.

An approach to reduce this weight, which is prohibitive for the operation of an electrical vehicle (apart from the cost), is the one presently on study by German manufacturers: by reducing the range to a safe minimum (a small fraction of the one provided by combustion vehicles) the weight and the cost of the batteries is reduced. The batteries, however, must be replaced in a suitable station provided with a fast loading/unloading facility and a station network must be provided for that purpose. This solution has the following drawbacks: the need to stop the service rather frequently, [said] *say* each hour as a minimum, for an interval of five minutes (so the designers say), in order to replace the batteries; the need to establish a station network in order to replace the batteries quickly; recharging apparatus at each station; and large capacity required for each vehicle, considering the recharging time of a battery volume equal to that necessary for a range of 1 day. On this subject, information may be found in the article "German Electric Prototype Vehicle Features Fast 'Refuel' Stops" in Product Engineering, May 1971, Page 23.

Another approach, aiming to provide an ideal urban transportation system, has been followed unsuccessfully by the Swiss firm OERLINKON in the fifties: apparently the vehicle was a trolley-bus, since it was provided with a trolly, but the electrical power line was not needed. The concept followed was to produce the electric power required for traction by conversion through a generator of the kinetic energy stored in a flywheel, which energy in turn, was taken by conversion, through a motor, of the electric energy supplied through the trolley during stops at prefixed stations. Such a vehicle has never been placed in public use by reason of many inconveniences: the low value of the storable specific energy and consequently limited range (about 1 kilometer for a vehicle of weight and performances equivalent to those of a trolley-bus); a recharging time for the flywheel which is too long; the dynamic accumulation of energy and, therefore, storage limited in time and the energy decreasing by reason of friction even when unused; the complexity of the flywheel clutch and the controls for the motor-generator-flywheel; and serious interference with the movement and driving of the vehicle due to the gyroscopic precession torque produced by the flywheel during changes in vehicle direction. Recently the same idea has been reconsidered by a well known American aerospace company which, by means of many technological improvements aims to increase the specific energy stored in the flywheel so as to obtain a greater range. The proposed vehicles would operate as a common trolley-bus for a certain portion of their way, draining energy from the electrical line for their movement as well as for charging the flywheel. Then they will continue for the remainder of the way using the energy stored in the flywheel. (See Product Engineering, July 20, 1970, pp. 80 and Apr. 12, 1971, pp. 54).

SUMMARY OF THE INVENTION

The inconveniences and disadvantages of the previous described systems are overcome by the transportation system which constitutes the object of the present invention. The transportation system described herein, mainly intended for urban mass transportation, is electrically powered, and therefore non-polluting and noiseless. According to the invention, the vehicles are operated by electric motors fed by storage batteries which are recharged (recharged and not replaced) at the stops with processes of fast recharge performed with current many times greater than the current currently supplied during traction and, the fast recharge current being of the order of several tens times the nominal current of the storage batteries including as much as of the order of 100 times the nominal current, for a particularly short time of the order of tens of seconds and normally not exceeding 1 minute. Recharge is obtained by means of connecting means which connect the vehicle to a distribution electrical network having connecting points at most of the stop stations established. With such a system, the following cumulative advantages are obtained: high exploitation of system resources; range adequate to the class of service considered with a safety margin exceeding traffic incidental events; absence of phenomena which may disturb the vehicle in its trajectory and driving (gyroscopic effects); complete path freedom among the stop stations (such as for motorbuses); optimization in the utilization of storage batteries; overall investment in storage batteries limited to the batteries installed on each vehicle; elimination along the whole vehicle way of the electric power line with the exception of a very short portion at most of the stop stations, and consequently: elimination of the problems caused by the electrical line such as installation, isolation, maintenance; and warranty of continued service, even in the case of an electrical power lack at the stations, at least for a duration depending on the vehicle range.

BRIEF DESCRIPTION OF THE DRAWINGS

These features and advantages will appear more clearly from the following description when considered in connection with the attached drawings in which.

DESCRIPTION OF THE PREFERRED EMBODIMENT

Figure 1:
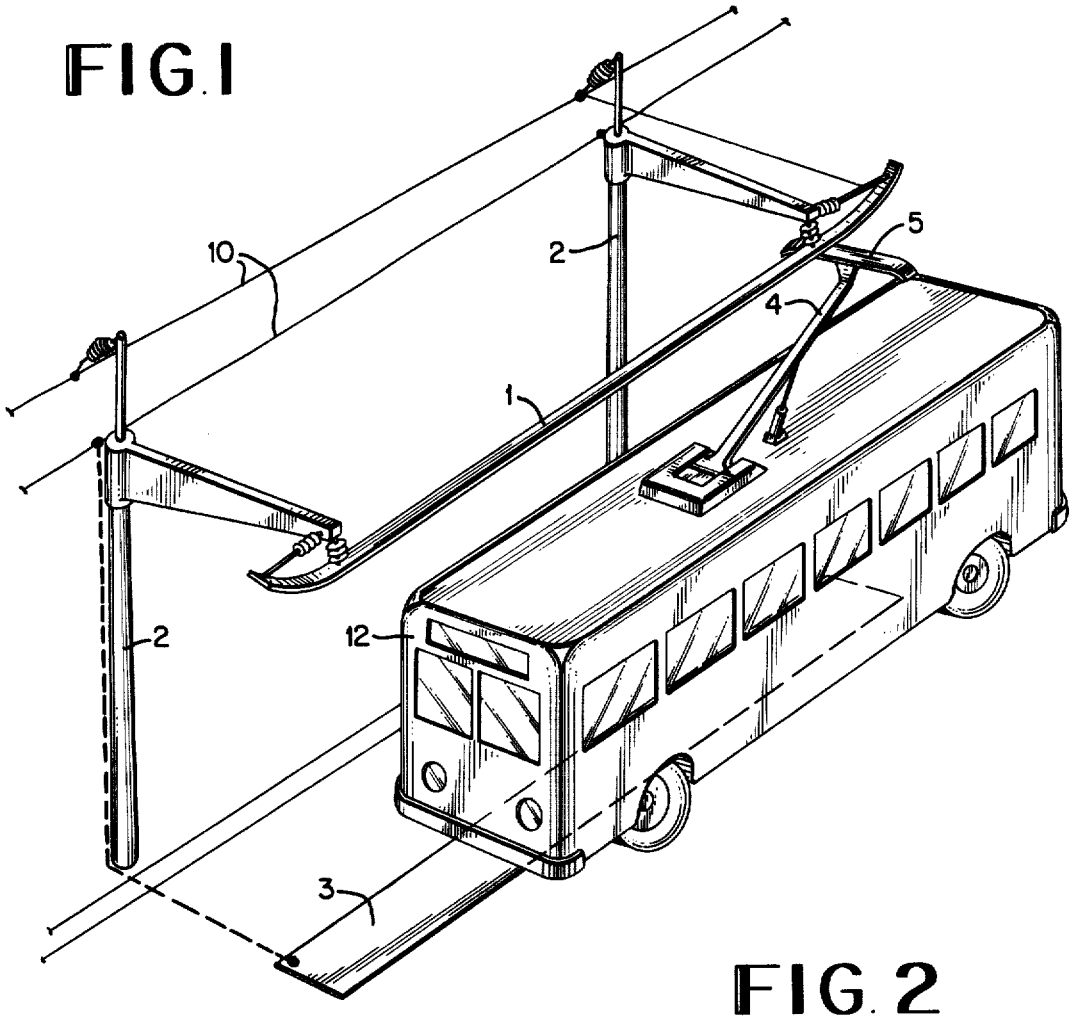
FIG. 1 shows in a perspective schematic view a vehicle suitable for the transportation system described herein and a stop station provided with connections for fast recharge of the vehicle batteries.

All urban mass transportation vehicles, in their intrinsic service, follow predetermined ways, divided into stretches by a sequence of stops or stations, suitably spaced. The distance between stops, related to the vehicle characteristics and to the urbanization density, is conditioned by the users' needs. Generally, it is considered that users must walk for less than half a kilometer in order to reach the closest stop. Therefore, as a rule, the stops provided for urban public vehicles are in the range of a few hundred meters, with a maximum near to one kilometer for undergrounds and a minimum of about 200 meters for surface means (see "1971 Urban Technology [conference] *Conference*" which reports 8 succession of motion cycles, interrupted by stops, more or less short, at the stop stations, to allow the entrance and exit of the passengers. Authoritative international commissions for the study of urban transportation means have determined that the average time for running a stretch between two stops is generally less than 1 minute and increases to 2 minutes in severe traffic. The stop time at the stations is normally between 5 and 15 seconds. From these observations it may be deduced that for urban vehicles of today the stop time is, on the average, one-tenth of the effective running time and usually becomes one-twentieth. If the motion of such vehicles is further considered, it may be observed that the traction work is never applied continuously along the whole stretch, but rather there are segments which normally are run by inertia and the always present segment corresponding to the last portion of the stretch, before each stop, which is effected with braking. This means that traction energy is applied generally for a time which does not exceed 10 times the stop interval.

The present invention is founded on these considerations and exploits the capability, recently verified in certain types of storage batteries, to accept intermittently, without damage, and many times. but during short intervals of application, very strong recharging currents, for instance in the order of many tens times the nominal discharging current. Universally known and followed recommendations prescribe long recharging times for storage batteries, generally in the order of many hours, with maximum current in the order of the nominal discharging current and this is made to avoid damage to the plates and excessive electrolyte heating with consequent gas generation. However, it has been found that, in certain kinds of storage batteries, such phenomena occur in response to currents much stronger than the nominal current, only after a certain time interval. That is, such phenomena practically do not occur if the application of a normally high current is contained in a limited number of seconds, which incidentally is the duration of the stop time at the stations for an urban vehicle. In fact, at the actual status of the art, certain kinds of batteries, such as, for instance, nickel-cadmium batteries can be quickly recharged by virtue of their low internal resistance which reduces heat development and priming of the above mentioned phenomena. Performed tests, supported by wide reports, show clearly that such batteries can be recharged at about 90 percent of their capacity in times of the order of 30 minutes. Also, it has been found that the same batteries can supply very strong discharging currents and in the regular way, without damage. Currents may be in the order of 100 times the nominal current (nominal current is by standard one-fifth of the value which represents the capacity in Amp.-hours) provided such discharges are limited to short times in the order of 1 minute. It has also been found that batteries of this type may be charged without damage with charging currents of the same order of magnitude (100 times nominal current) for times in the order of some tens of seconds if suitable control procedures for the charging voltage are followed. Such procedures are, for instance, described in THE ELECTRO-CHEMICAL SOCIETY CONVENTION-FALL JOINT REPORT-CLEVELAND-OHIO—Oct. 3/7, 1971. Such capability of fast partial recharge, alternated with discharge periods or rest periods, provides feasibility for an electrical traction vehicle particularly suitable for the above described urban service and leads to the transportation system which is the object of the present invention. For such kind of service, in fact, a battery powered electrical vehicle may receive, during stops and by effect of a fast recharge, the same energy amount used for running a stretch. As will be presently described in greater detail, the battery powered vehicles of the transportation system of the present invention are connected rapidly and automatically to an electric power network at each of a plurality of recharge stop stations. The power network supplies charging current to the batteries carried by the vehicle with a current having a magnitude which is much greater than the nominal current of the batteries. In particular, very strong recharging currents of the order of many tens times the nominal discharging current are provided to the batteries and may indeed be as large as currents of the order of 100 times the nominal current. This high recharging current is supplied for the relatively brief period of time the vehicle is located at a recharge stop station, which time will be of the order of tens of seconds and in normal operation will be less than 1 minute.

For example, let us consider a vehicle having performance equivalent to that of a normal trolley-bus. The continuous electrical installed power for this vehicle averages 70 Kwatt. During start, the used power is greater than normal power in the order of 100 Kwatt. Such power is requested during the acceleration phase for a period of about 10 seconds. The remainder of the stretch, till the next stop, is with an average power used of 25 Kwatt, which is required to maintain the movement. This portion of the stretch, requires an average of 25 seconds. In the terminal phase of the stretch, it is normally considered that during braking the kinetic energy is recovered and converted by the same motor-generator to electrical energy. In spite of that, and in order to make the example simpler, we will assume that no recovery devices are provided and that the whole kinetic energy is wasted. By this assumption the energy required to run a stretch is:

$$E_{Tot}=E_s+E_m$$

where $E_s$=Start Energy $E_m$=maintenenace energy.

Therefore:

$$E_{Tot}=\frac{100\times 10}{3{,}600}+\frac{25\times 25}{3{,}600}=0.45\text{ Kwatt-hour.}$$

Such energy may be easily provided to a storage battery carried by the vehicle, by means of a fast recharge operation. Assuming the voltage used by the transportation system is 500 V. and that the available recharge time is 14 seconds, the recharging current which must be adopted to supply again the used energy, with a recharge efficiency of 0.7 is about 340 A. To have a ratio between charging current and storage capacity equal to 10, which ratio has been proved to be fully acceptable for a fast recharge, an installed capacity of 34 Amp.-hours is required. Related to the adopted voltage, this means a capacity of 17 Kwatt-hours. Since the capacity available from presently manufactured alkaline nickel-cadmium batteries is at 25 Watt-hours per each installed kilogram and 50 Watt-hours per each cubic decimeter of volume, a storage battery of about 650 kilograms and a volume of about 0.32 $M^3$ is required to meet the desired capacity. Such values are fully acceptable for a vehicle whose dead weight is about 8000 kg.: the total weight of the batteries and the motor, is slightly greater than the weight of a diesel engine and related apparatus. Since the nominal current is equal to one-fifth the battery capacity in Amp.-hours, the 34 Amp.-hours capacity in the above example corresponds with a nominal current of 6.8 A. Thus, in this example, the recharging current of 340 A. has a magnitude which is 50 times the nominal current. In addition, it has to be remarked that the above installed capacity allows the vehicle to run at least 10 to 15 stretches without any recharge and therefore it offers an extremely high safety margin to allow the most complete mobility of the vehicle in the urban area even if, for any reason, it is impossible to effect the fast recharge in one or more subsequent recharging stations. In addition, since the stop at the terminals are generally longer, it is eventually possible to complete the energy recovery in such places, and it may be concluded that it is not required that all the stop stations be provided with recharging devices (for instance, auxiliary stops).

Figure 2:
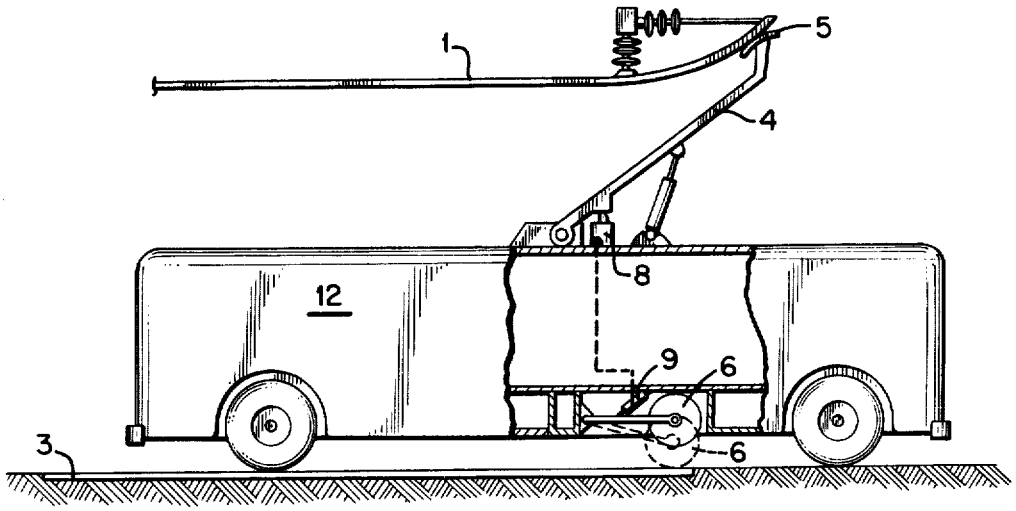
FIG. 2 shows schematically in an elevation view the electrical connection means between a vehicle and a feeding station of FIG. 1.

The stations enabled for the fast recharge operation must not demand any particular operation by the driver. They must be suitably equipped so as to allow an automatic connection, quick and reliable, of the vehicle to the recharging line, thus providing the maximum exploitation of the stop time available. By way of example, in FIGS. 1 and 2 is shown an arrangement which satisfies the requirements above: 1 indicates a conductive rod, which can be made suitably heavy and rigid in order to sustain a certain thrust by the vehicle body 12, and suitably long so as to allow the connection of more than one vehicle. The rod, connected to a pole of the electrical distribution network 10, is supported by posts 2 (which at the same time may support a shelter) at a suitable distance from the street edge and at the standard height for trolley-lines. Under the rod, perpendicularly and for the same length, a metallic plate 3 is embeded in the street. The plate is connected to the other grounded pole of the distribution network.

The unipolar contacting device 4, which may be a simple rod trolley or a pantograph trolley, carries on the top a sufficiently long and transversely disposed contact bar 5. When, during the braking phase, the vehicle slips beneath the contacting rod 1, the bar 5 touches the tapered portion of the rod 1 and, sliding in contact with it, is lowered and commands the fast descent of a sliding shoe or contacting wheel 6 down onto the plate 3 so that the recharge circuit closes. The command may be obtained through a switch 8 which is switched by the lowering of the trolley 4. The switch may command a servosystem 9 (which may be electrical, hydraulic or pneumatic) which establishes the contact between sliding shoe 6 and plate 3. The same movements and commands are inversely performed at the start of the vehicle so that the recharging time may be increased in respect to the effective stop time by the addition of two short movement intervals it is it provided that the recharging operation occurs automatically, for the whole time in which the electrical contact is established.

In addition, since it is possible to have a wide contacting surface, of at least 2 $cm^2$ no resistance problems arise, and the current intensity may be kept within acceptable limits. A power line, completely independent from the vehicle's path, connects the stations. The isolation of this line, may be made in a conventional way with better and cheaper results than that obtainable with contacting lines from trolley-buses or trolley-cars.

Figure 3:
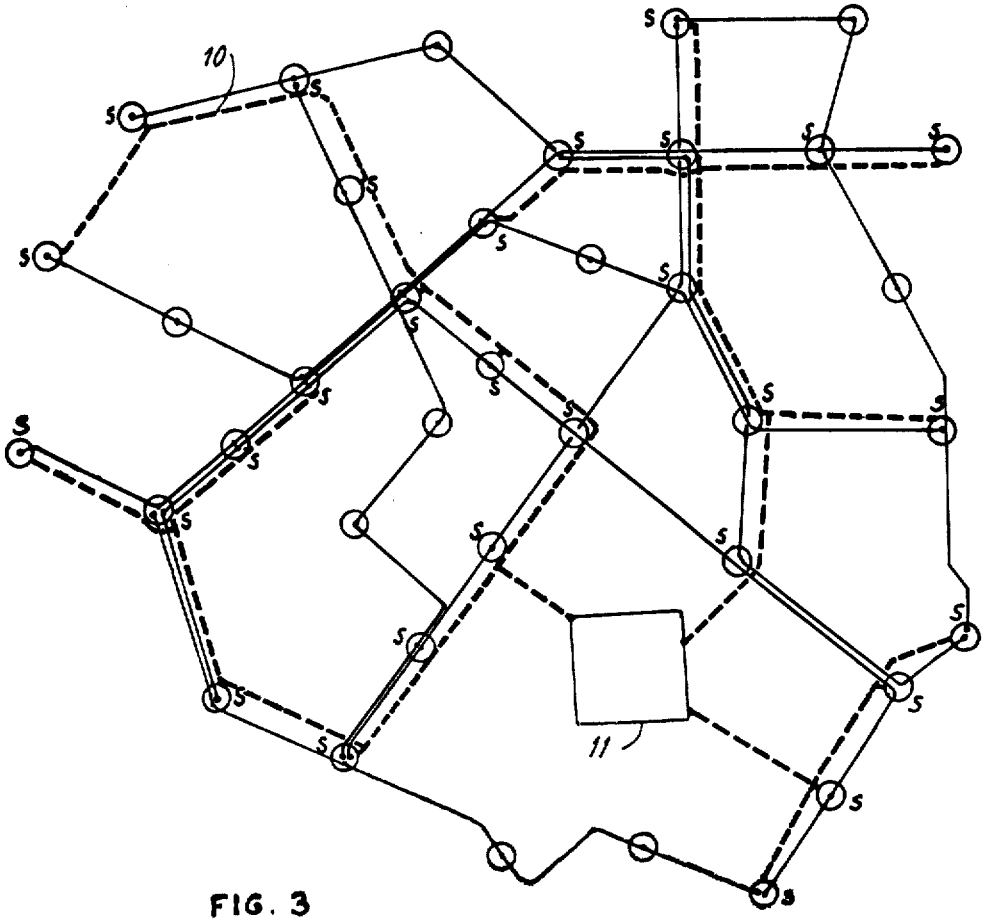
FIG. 3 shows schematically the layout of an urban transportation system and the stop-feeding stations according to the invention.

Furthermore, a station may be used contemporaneously for many lines so that a whole urban mass transportation system may be arranged with a limited number of stations, still leaving the maximum freedom to the lines' routes. FIG. 3 shows schematically such a feature. The routes are represented with solid lines. Each station is represented by a small circle. Some of them, indicated by the letter S are provided with fast recharging devices and are connected to a feeding line. The electrical feeding line 10 for such devices is represented with dotted lines and is connected to a power station 11. Clearly, the electrical feeding network may be connected to more power stations. Looking at FIG. 3, it may be seen that the electrical feeding network is completely independent from the routes of the vehicles. Therefore, it may be arranged according to minimum cost criteria, maximum efficiency or other factors which may be completely free from the routing requirements, except for what concerns the recharging stations. In other words it may be said that, while conventional transportation systems are based on a network structure, and therefore on a rigid structure, the transportation system according to the invention is based on a junction structure (recharging stations) which allows the same flexibility till now provided by motor-transportation systems. It must be further pointed out that the distribution network 10 may be conveniently of the bipolar type, so that ground current returns are not needed and damaging leakage currents are prevented.

The urban transportation system described above considers the utilization of free routing vehicles, but it is clear that the invention may be applied also to rail vehicles, such as trolley-cars, underground vehicles, suburban railways, and, by suitable modifications, also to transportation systems using boats having predetermined docking points as well as to private internal transportation systems employing electrical trucks and elevators.

That which is claimed is:

1. A vehicle for an electrical traction passenger transportation network having a plurality of stop stations for loading and unloading passengers, said stop stations being other than terminals, at least some of said stop stations being recharge stop stations provided with contact means for connecting a vehicle to an electric power line, and stretches between successive recharge stop stations, said vehicle stopping a relatively short stop time of the order of tens of seconds, normally not exceeding 1 minute, at each recharge stop station and consuming an amount of energy while running each stretch in between successive recharge stop stations, said vehicle comprising:

electric motor traction means;

storage battery means having a storage capacity sufficient to store the maximum amount of energy required to drive said vehicle over a stretch between successive recharge stop stations, said battery means having a nominal loading current; and circuit means, including fast connection means for connecting said storage battery means to said contact means at a recharge stop station with a connection time permitting fast recharging of said battery means for substantially all of said stop time, for providing said battery means with fast recharging current from said power line which is of the order of several tens times the magnitude of said nominal current, including as much as the order of 100 times said nominal current, and of sufficient magnitude that said maximum amount of energy will be stored in said battery means during said relatively short stop time.

2. An electric traction transportation system, comprising:

at least one vehicle as claimed in claim 1; and a plurality of said stop stations, at least some of which are said recharge stop stations provided with said contact means for cooperating with said fast connection means for connecting said vehicle to said electric power line.

3. An electrical traction transportation system as claimed in claim 2, wherein said contact means comprises an aerial feeding bar and a ground feeding plate.

4. A vehicle as claimed in claim 1, further comprising means for automatically connecting said fast connection means to said contact means at the recharge stop stations.

5. A vehicle as recited in claim 1, wherein said fast connection means operates to connect said vehicle to said contact means while said vehicle is coming to a stop and to disconnect said vehicle from said contact means after said vehicle starts into motion so that all of said stop time and two short movement intervals are available for charging said battery means.

6. A vehicle as recited in claim 1, wherein said contact means comprises an overhead contact bar and a ground contact plate and said fast connection means includes a trolley for contacting said overhead contact bar and means responsive to engagement of said trolley with said overhead contact bar for lowering into contact with said contact plate.

7. A method of operating an urban mass passenger transportation system including a plurality of electric traction vehicles, each vehicle having battery means and a plurality of recharge stop stations for loading and unloading passengers, said stop stations being other than terminals and being separated by stretches, each recharge stop station having contact means for connecting one of said vehicles to an electric power line, comprising the steps of:

energizing one of said vehicles from the energy stored in said battery means for movement along one of said stretches between two of said recharge stop stations;

rapidly connecting said vehicle to said contact means as it stops at a stop station; and recharging said battery means with at least the same energy consumed while driving said vehicle over the preceding stretch with a fast recharge operation over a relatively short stop time of the order of tens of seconds, normally not exceeding one minute, while said vehicle is stopped at said stop station by drawing recharging current which is of the order of several tens times the nominal loading current of said battery means, including as much as the order of 100 times said nominal loading current, from said power line.

* * * * *

UNITED STATES PATENT OFFICE

CERTIFICATE OF CORRECTION

Patent No. Re. 29,994 Dated May 15, 1979

Inventor(s) Oscar Bossi

It is certified that error appears in the above-identified patent and that said Letters Patent are hereby corrected as shown below:

Col. 2, line 42, "trolly" is changed to -- trolley --.

Col. 4, line 9, after "8" insert -- stops per mile). The movement of said urban vehicles from one terminal to another is characterized by a --.

Col. 4, line 33, after "times" change the period to -- , --.

Col. 5, line 53, change "maintenenace" to -- maintenance --.

Col. 6, line 67, change "it is it" to -- if it is --.

Signed and Sealed this

Seventh Day of August 1979

[SEAL]

Attest:

Attesting Officer

LUTRELLE F. PARKER

Acting Commissioner of Patents and Trademarks